United States Patent [19]

Sugiki

[11] Patent Number: 4,744,073
[45] Date of Patent: May 10, 1988

[54] RECORDING/REPRODUCING OPTICAL SYSTEM UTILIZING SEMICONDUCTOR LASER LIGHT SOURCE AND ANAMORPHIC IMAGING ELEMENT

[75] Inventor: Mikio Sugiki, Kanagawa, Japan
[73] Assignee: Sony Corporation, Tokyo, Japan
[21] Appl. No.: 816,128
[22] PCT Filed: Apr. 12, 1985
[86] PCT No.: PCT/JP85/00195
§ 371 Date: Dec. 11, 1985
§ 102(e) Date: Dec. 11, 1985
[87] PCT Pub. No.: WO85/04978
PCT Pub. Date: Nov. 7, 1985

[30] Foreign Application Priority Data

Apr. 18, 1984 [JP] Japan .................................. 59-77891

[51] Int. Cl.$^4$ .............................................. G11B 7/00
[52] U.S. Cl. .................... 369/112; 369/121; 369/122; 346/76 L; 346/108; 350/420
[58] Field of Search ................ 350/420; 369/112, 121, 369/122; 346/76 L, 108

[56] References Cited

U.S. PATENT DOCUMENTS

| 4,318,594 | 3/1982 | Hanada | 350/433 |
| 4,390,235 | 6/1983 | Minoura | 346/108 X |
| 4,466,087 | 8/1984 | Cheng | 369/121 X |
| 4,520,471 | 5/1985 | Carlin | 369/112 |
| 4,520,472 | 5/1985 | Reno | 369/112 |

FOREIGN PATENT DOCUMENTS

56-163533 12/1981 Japan .

*Primary Examiner*—Robert L. Richardson
*Attorney, Agent, or Firm*—Lewis H. Eslinger

[57] ABSTRACT

In a recording/reproducing optical system of the invention, which comprises a semiconductor laser causing single transverse mode oscillation and having beam radiation angles of $\theta\perp$ and $\theta\,\|$ in planes normal and parallel to an active layer, respectively; a collimator lens having a focal length $f_c$; an anamorphic optical element having a magnification ratio of $1:\beta$ in two directions crossing each other at right angles; and an objective lens having a focal length $f_0$, a numerical aperture $NA_0$ and an aperture $2A_0$, and in which ratios $A_0/W\perp$ and $A_0/W\,\|$ of the apertures to diameters $2W\perp$ and $2W\,\|$, on the planes normal and parallel to the active layer, of beams which are emitted from the semiconductor laser, pass through the collimator lens and the anamorphic optical element and are incident to the objective lens have the following relations with predetermined values $fi\perp$ and $fi\,\|$:

$$A_0/W\perp \leq fi\perp$$

$$A_0/W\,\| \leq fi\,\|$$

coupling efficiency $\eta$ has the following relation with a predetermined value $\eta_d$:

$$\eta \geq \eta_d$$

and, optical recording/reproducing is performed by the beams, $M = f_c/f_0$ and $\beta$ satisfy the following relations:

$$M \geq NA_0/(\sin\theta\perp \cdot fi\perp)$$

$$M\cdot\beta \geq NA_0/(\sin\theta\,\| \cdot fi\,\|)$$

$$M^2 \cdot \beta \leq 0.74 NA_0^2/(\sin\theta\perp \cdot \sin\theta\,\| \cdot \eta_d^2)$$

1 Claim, 4 Drawing Sheets

RECORDING/REPRODUCING OPTICAL SYSTEM UTILIZING SEMICONDUCTOR LASER LIGHT SOURCE AND ANAMORPHIC IMAGING ELEMENT

TECHNICAL FIELD

The present invention relates to an optical system for optical recording/reproducing.

BACKGROUND ART

Data recording on a medium, which can be optically accessed, e.g., an optical disk, requires about 10 mW power. However, a semiconductor laser, which is widely used as a light source for such recording has only low optical output of about 20 to 30 mW. For this reason, an optical output from a semiconductor laser must be effectively utilized, and high coupling efficiency is required for an optical system.

Meanwhile, when data is reproduced from an optical disk, higher reproducing performance can be obtained if light beams becomes incident to lenses more uniformly. FIG. 1 shows this phenomenon. An aperture 2A of a lens is smaller than a diameter 2W of a beam, and as A/W becomes smaller, MTF becomes higher.

In other words, high reproducing performance and high coupling efficiency are contrary requirements. Therefore, a recording/reproducing optical system which satisfies both the requirements and can cope with variations in optical constants of optical elements has not yet been known.

DISCLOSURE OF INVENTION

The present invention has been made in consideration of the above situation, and has as its object to provide a recording/reproducing optical system which has predetermined reproducing performance and coupling efficiency, and can cope with variations in optical constants of optical elements.

In order to achieve the above object, there is provided a recording/reproducing optical system, which comprises a semiconductor laser causing single transverse mode oscillation and having beam radiation angles of $\theta\perp$ and $\theta\|$ in planes normal and parallel to an active layer, respectively; a collimator lens having a focal length $F_c$; an anamorphic optical elemet having a magnification ratio of 1:$\beta$ in two directions crossing each other at right angles; and an objective lens having a focal length $F_0$, a numerical aperture $NA_0$ and an aperture $2A_0$, and in which ratios $A_0/W\perp$ and $A_0/W\|$ of the apertures to diameters $2W\perp$ and $2W\|$, on the planes normal and parallel to the active layer, of beams which are emitted from the semiconductor laser, pass through the collimator lens and the anamorphic optical element and are incident to the objective lens have the following relations with predetermined values $fi\perp$ and $fi\|$:

$$A_0/W\perp \leq fi\perp$$

$$A_0/W\| \leq fi\|$$

coupling efficiency $\eta$ has the following relation with a predetermined value $\eta_d$:

$$\eta \geq \eta_d$$

and, optical recording/reproducing is performed by the beams, wherein $M = f_c/f_0$ and $\beta$ satisfy the following relations:

$$M \geq NA_0/(\sin\theta\perp \cdot fi\perp)$$

$$M\cdot\beta \geq NA_0/(\sin\theta\| \cdot fi\|)$$

$$M^2\cdot\beta \leq 0.74 NA_0^2/(\sin\theta\perp \cdot \sin\theta\| \cdot \eta_d^2)$$

BEST MODE OF CARRYING OUT THE INVENTION

An embodiment of the present invention will be described hereinafter with reference to FIGS. 2 to 5.

Figure 1:
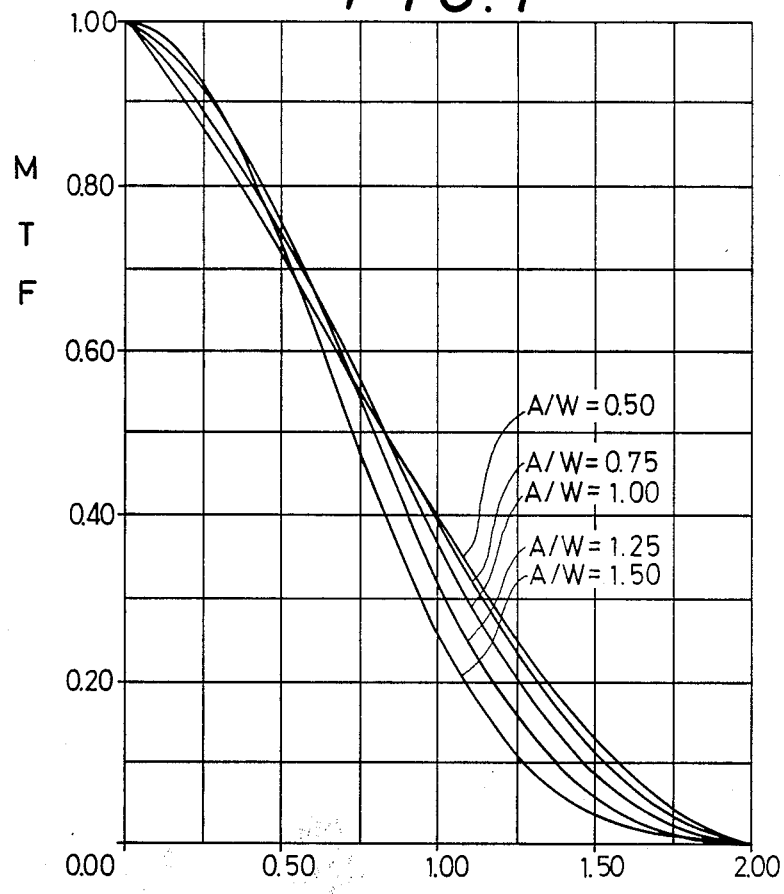
FIG. 1 is a graph showing the relationship between a ratio of a lens aperture and a beam diameter, and reproducing performance.
Figure 2:
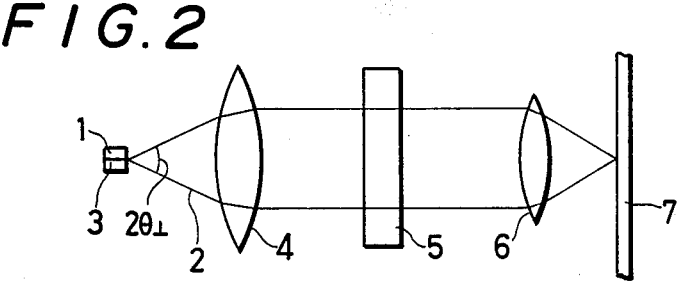
FIG. 2 is a schematic side view showing an embodiment of the present invention.

FIG. 2 shows an arrangement according to the embodiment. A semiconductor laser 1 causes single transverse mode oscillation. Beam intensity of light beams 2 radiated from the semiconductor laser 1 has a distribution approximate to the Gaussian distribution on a cross section normal to the optical axis.

Angles formed by the optical axis and light beams passing through a distal end of the beam radius of the beams 2 radiated from the semiconductor laser 1, i.e., a point at which the intensity thereof becomes $1/e^2$ of a value on the optical axis are $\theta\perp$ and $\theta\|$ ($\theta\perp > \theta\|$) in planes normal and parallel, respectively, to an active layer 3 of the semiconductor laser 1. In addition, a cross section of the beams 2 in a direction normal to the optical axis represents an elliptical shape.

For this reason, the beams 2 passing through a collimator lens 4 having a focal length $f_c$ and a numerical aperture $NA_c$ are modified into a cross-sectional shape approximate to a circle by an anamorphic optical element 5 such as a prism, a lens and the like. The anamorphic optical element 5 used in this embodiment has an enlargement function of a magnification $\beta$ ($\geq 1$) in one of two directions crossing each other at right angles, and has no enlargement function in the other direction.

Beam radii of the beams 2 passing through the anamorphic optical element 5 are $W\perp$ and $W\|$ on planes normal and parallel to the active layer 3. The beams 2 are conveyed by an objective lens 6 having a focal length $f_0$ and a numerical aperture $NA_0$, and become incident on a recording surface of an optical disk 7.

In general, the semiconductor laser 1 and the objective lens 6 cannot so freely be selected. When an aperture $2A_c$ ($=2f_c\cdot NA_c$) of the collimator lens 4 is set to be larger than an aperture $2A_0$ ($=2f_0\cdot NA_0$) of the objective lens 6, reproducing performance of the optical system is defined by the ratios of the aperture $2A_0$ of the objective lens 6 to diameters $2W\perp$ and $2W\|$ of the beams 2 incident to the objective lens 6.

Therefore, optical constants of the collimator lens 4 and the anamorphic optical element 5 must be set to be appropriate values in order that these ratios and coupling efficiency $\eta$ of the optical system satisfy the following relations with corresponding predetermined values fi$\perp$, fi$\|$, and $\eta_d$:

$$A_0/W\perp \leq fi\perp \qquad (1)$$

$$A_0/W\| \leq fi\| \qquad (2)$$

$$\eta \geq \eta_d \qquad (3)$$

The above relations 1 and 2 can be written as follows:

$$A_0/W\perp = f_0 \cdot NA_0/(\sin \theta\perp \cdot f_c) \leq fi\perp$$

$$A_0/W\| = f_0 \cdot NA_0/(\sin \theta\| \cdot f_c \cdot \beta) \leq fi\|$$

Therefore, assuming that $M = f_c/f_0$, these relations can be written as follows:

$$M \geq NA_0/(\sin \theta\perp \cdot fi\perp) \qquad (4)$$

$$M \cdot \beta \geq NA_0/(\sin \theta\| \cdot fi\|) \qquad (5)$$

Meanwhile, when the beams 2 exhibit the Gaussian intensity distribution, if directions normal to and parallel to the active layer 3 are given by the x and y directions, the coupling efficiency $\eta$ of the optical system can be expressed by:

$$\eta = \left\{ \int\int A_0 dxdy \, \exp(-2 \cdot ((A/W)_x \cdot x)^2) \cdot \exp(-2 \cdot ((A/W)y \cdot y)^2) \right\} / \left\{ \int\int_{-\infty}^{\infty} dxdy \, \exp(-2 \cdot ((A/W)_x \cdot x)^2) \cdot \exp(-2 \cdot ((A/W)_y \cdot y)^2) \right\} \qquad (6)$$

$$A_0: \sqrt{X^2 + Y^2} \leq 1$$

Figure 3:
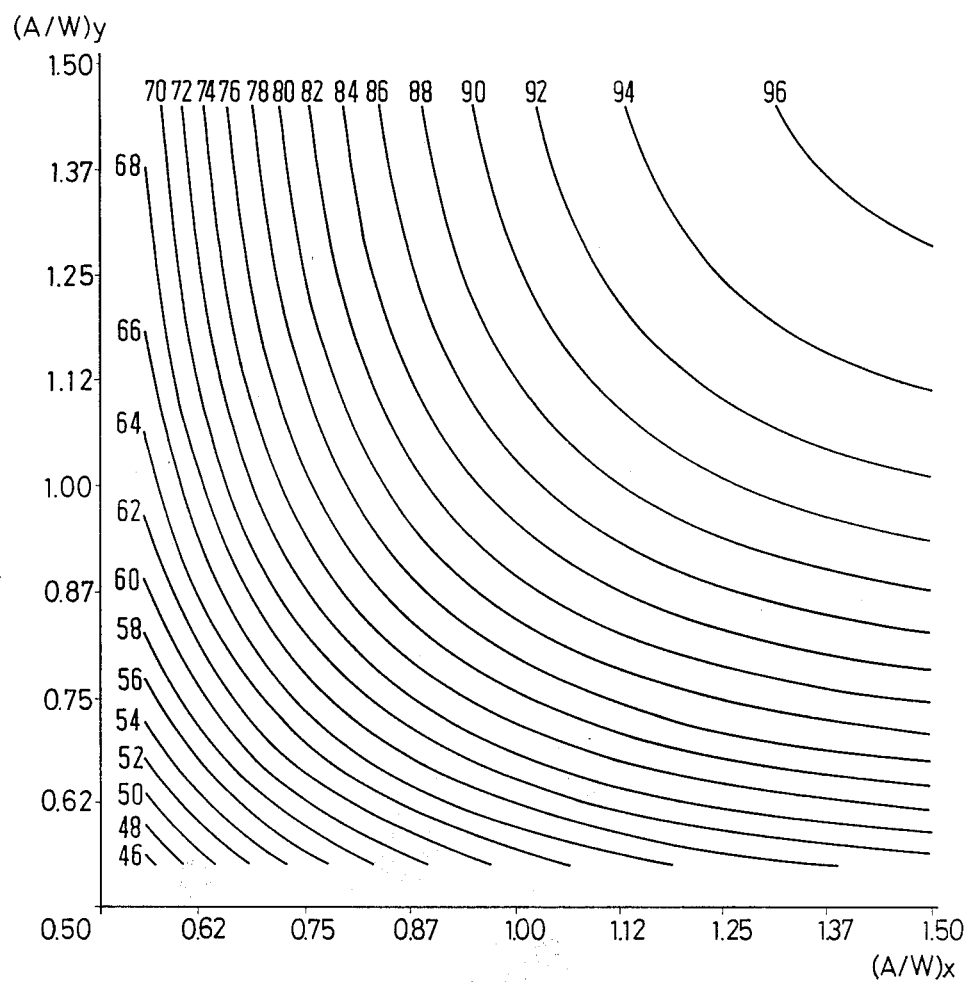
FIG. 3 is a graph showing the relationship between a ratio of a lens aperture and a beam diameter, and coupling efficiency.
Figure 4:
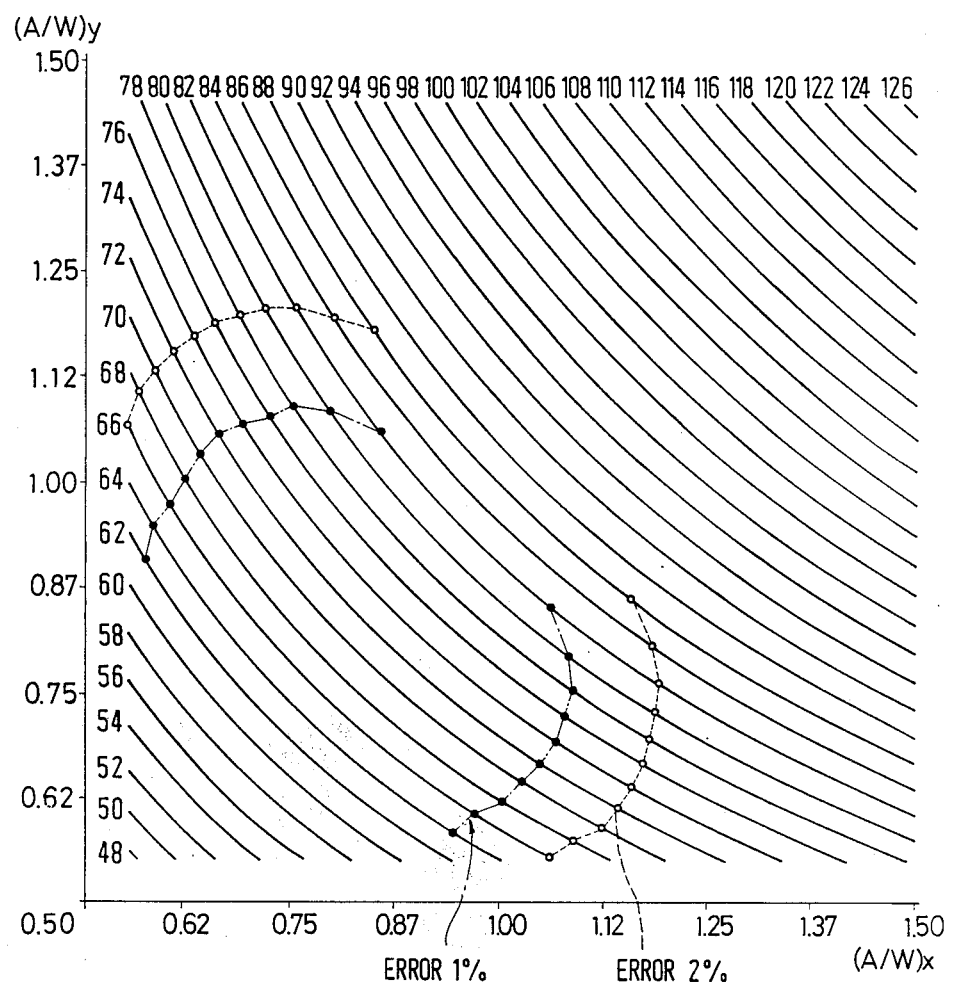
FIG. 4 is a graph approximately showing the relationship shown in FIG. 3.

FIG. 3 shows equilevel lines of the coupling efficiency $\eta$ obtained from the relationship 6. FIG. 4 shows equilevel lines of the coupling efficiency obtained by approximating the relation 6 using the following relation:

$$\eta = 0.86 \times \sqrt{(A/W)_x \cdot (A/W)_y} \qquad (7)$$

Broken lines in FIG. 4 show the ranges within which an error of the relationship 7 is 2% or less, and A/W is 1.12 or lower. Dotted lines in FIG. 4 show the ranges within which an error is 1% or less, and A/W is about 1.10 or lower. So, when the relation 7 is used, the relation 3 yields:

$$M^2 \cdot \beta \leq 0.74 NA_0^2/(\sin \theta\perp \cdot \sin \theta\| \cdot \eta_d^2) \qquad (8)$$

Thus, when the ratio M of the focal length $f_c$ of the collimator lens 4 to the focal length $f_0$ of the objective lens 6, and the enlargement magnification $\beta$ of the anamorphic optical element 5 are selected to satisfy the relation 4, 5, and 8, the relations 1, 2, and 3 as requirements of the reproducing performance and coupling efficiency of the optical system can be satisfied.

Figure 5:
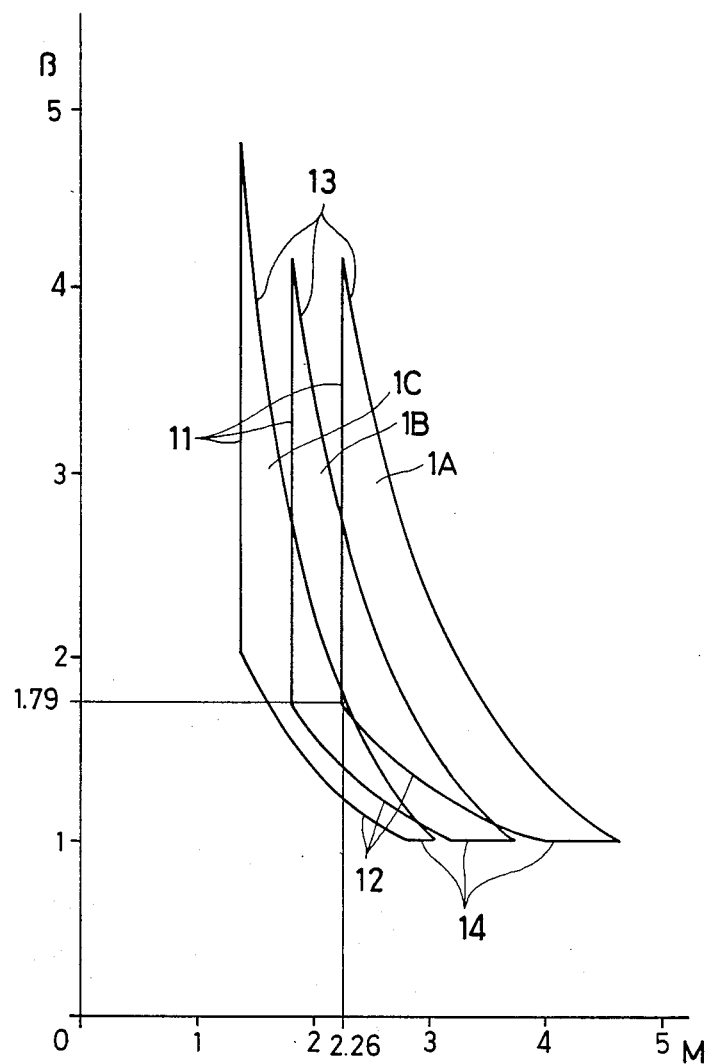
FIG. 5 is a graph showing an optical constant of the embodiment of the present invention.

FIG. 5 shows M and $\beta$ obtained by the relations 4, 5, and 8. Referring to FIG. 5, $NA_0 = 0.50$, fi$\perp \leq 0.80$, fi$\| \leq 1.00$, and $\eta_d \geq 0.50$, and three semiconductor lasers 1A, 1B, and 1C having different beam radiation angles were used.

Angles at which a half-width of the beam radiation angle of the semiconductor laser 1A, i.e., the intensity of the beams 2 becomes ½ that on the optical axis are 19.00° and 8.50° respectively in planes normal and parallel to the active layer 3. As for the semiconductor laser 1B, the angles are 23.50° and 10.50°, respectively, and for the semiconductor laser 1C, 31.50° and 12.00°, respectively. Note that the above angles $\theta\perp$ and $\theta\|$ can be obtained by multiplying 0.847 with the half-widths.

Referring to FIG. 5, lines 11 correspond to fi$\perp = 0.80$, curves 12 correspond to fi$\| = 1.00$, curves 13 correspond to $\eta_d = 0.50$, and lines 14 correspond to $\beta = 1$. Ranges surrounded by these lines and curves 11 to 14 are ranges of M and $\beta$ for the semiconductor lasers 1A, 1B, and 1C.

Therefore, as can be seen from FIG. 5, assuming that $M = 2.26$ and $\beta = 1.79$, even when any of the semiconductor lasers 1A, 1B, and 1C is used, the predetermined reproducing performance and coupling efficiency expressed by the relations 1, 2, and 3 can be obtained.

INDUSTRIAL APPLICATION

As described above, in a recording/reproducing optical system according to the present invention, since a ratio of a focal length of a collimator lens to a focal length of an objective lens, and a magnification of an anamorphic optical element are arranged to satisfy predetermined relations, predetermined reproducing performance and coupling efficiency can be provided. In addition, the optical system can cope with variations in optical constants of optical elements.

What is claimed is:

1. A recording/reproducing optical system, which comprises a semiconductor laser causing single transverse mode oscillation and having beam radiation angles of $\theta\perp$ and $\theta\|$ in planes normal and parallel to an active layer, respectively; a collimator lens having a focal length $f_c$; an anamorphic optical element having a magnification ratio of 1:$\beta$ in two directions crossing each other at right angles; and an objective lens having a focal length $f_0$, a numerical aperture $NA_0$ and an aperture $2A_0$, and in which ratios $A_0/W\perp$ and $A_0/W\|$ of the apertures to diameters $2W\perp$ and $2W\|$, on the planes normal and parallel to said active layer, of beams which are emitted from said semiconductor laser, pass through said collimator lens and said anamorphic optical element and are incident to said objective lens have the following relations with predetermined values fi$\perp$ and fi$\|$:

$$A_0/W\perp \leq fi\perp$$

$$A_0/W\| \leq fi\|$$

coupling efficiency $\eta$ has the following relation with a predetermined value $\eta_d$:

$$\eta \geq \eta_d$$

and, optical recording/reproducing is performed by the beams, characterized in that $M = f_c/f_0$ and $\beta$ satisfy the following relations:

$$M \geq NA_0/(\sin \theta\perp \cdot fi\perp)$$

$$M \cdot \beta \geq NA_0/(\sin \theta\| \cdot fi\|)$$

$$M^2 \cdot \beta \leq 0.74 NA_0^2/(\sin \theta\perp \cdot \sin \theta\| \cdot \eta_d^2)$$

* * * * *